US009657785B2

(12) United States Patent
Arnault et al.

(10) Patent No.: US 9,657,785 B2
(45) Date of Patent: May 23, 2017

(54) ROLLING BEARING, NOTABLY FOR CLUTCH RELEASE BEARING DEVICE

(71) Applicants: Benoit Arnault, Saint-Cyr-sur-Loire (FR); Eric Baudez, Fondettes (FR); Mickael Chollet, Joué-lès-Tours (FR); Philippe Walter, Fondettes (FR)

(72) Inventors: Benoit Arnault, Saint-Cyr-sur-Loire (FR); Eric Baudez, Fondettes (FR); Mickael Chollet, Joué-lès-Tours (FR); Philippe Walter, Fondettes (FR)

(73) Assignee: AKTIEBOLAGET SKF, Gothenburg (SE)

( * ) Notice: Subject to any disclaimer, the term of this patent is extended or adjusted under 35 U.S.C. 154(b) by 98 days.

(21) Appl. No.: 14/690,906

(22) Filed: Apr. 20, 2015

(65) Prior Publication Data

US 2015/0308516 A1  Oct. 29, 2015

(30) Foreign Application Priority Data

Apr. 24, 2014 (FR) ...................................... 14 53666

(51) Int. Cl.
*F16D 23/14* (2006.01)
*F16C 33/76* (2006.01)
*F16C 33/78* (2006.01)

(52) U.S. Cl.
CPC .............. *F16D 23/14* (2013.01); *F16C 33/76* (2013.01); *F16C 33/7823* (2013.01); *F16C 2361/43* (2013.01); *F16D 2300/08* (2013.01)

(58) Field of Classification Search
CPC .... F16D 23/14; F16D 23/147; F16D 2300/08; F16C 33/72–33/805; F16C 2361/43
See application file for complete search history.

(56) References Cited

U.S. PATENT DOCUMENTS

| 2,743,950 | A |   | 5/1956 | Helfrecht et al. |   |
|---|---|---|---|---|---|
| 4,838,402 | A | * | 6/1989 | Feser | ...................... F16C 33/76 |
|   |   |   |   |   | 192/110 B |
| 2011/0129175 | A1 | * | 6/2011 | Suzuki et al. | ........ F16C 19/163 |
|   |   |   |   |   | 384/480 |
| 2011/0206311 | A1 | * | 8/2011 | Dittmer et al. | ......... F16D 23/14 |
|   |   |   |   |   | 384/607 |

FOREIGN PATENT DOCUMENTS

| DE | 3709237 A1 | 9/1988 |
|---|---|---|
| EP | 2287486 A1 | 2/2011 |
| FR | 2883347 A1 | 9/2006 |
| JP | 2010084902 A | 4/2010 |

* cited by examiner

*Primary Examiner* — Richard Lorence
(74) *Attorney, Agent, or Firm* — Bryan Peckjian; SKF USA Inc. Patent Dept.

(57) ABSTRACT

A rolling bearing including an inner ring, an outer ring, at least one row of rolling elements disposed between the inner ring and the outer ring, and (a) at least one seal fixed to one of the inner ring and the outer ring as well as (b) at least one internal sealing lip cooperating with a first portion of the other of the inner ring and the outer ring. The seal further includes at least one external sealing lip offset axially relative to the internal sealing lip on the exterior side of the bearing. The external sealing lip cooperates with a second portion of the other ring, wherein the second portion of the seal is separate from the first portion and situated axially facing the seal.

14 Claims, 4 Drawing Sheets

ROLLING BEARING, NOTABLY FOR CLUTCH RELEASE BEARING DEVICE

CROSS REFERENCE TO RELATED APPLICATIONS

This is a Non-Provisional patent application, filed under the Paris Convention, claims the benefit of France Patent (FR) Application Number 1453666 filed on 24 Apr. 2014, which is incorporated herein by reference in its entirety.

FIELD OF THE INVENTION

The present invention concerns the field of rolling bearings, notably those used in clutch release bearing devices intended to act on the diaphragm of a clutch, in particular for motor vehicles.

PRIOR ART

Such devices include a rolling bearing one of the rings of which rotates and the other of which is fixed, the rotating ring being provided with a radial attack surface intended to come into contact with the end of a maneuvering member such as a diaphragm of the clutch, for example.

A non-rotating maneuvering element supports the rolling bearing and, when acted on by a (mechanical, electrical or hydraulic) control member, moves the bearing axially to cause the attack surface of the rotating ring to press against the diaphragm of the clutch and actuate the clutch mechanism.

A self-centering or self-aligning sleeve is generally disposed between the inner ring of the rolling bearing and the maneuvering element, the sleeve providing the axial connection between these two parts at the same time as, by virtue of its elasticity, allowing relative radial movement between them. The rolling bearing can therefore move in order to obtain radial alignment of the rotation axes of the bearing and the diaphragm so as to be self-centered on the latter. For more details of such a rolling bearing, see for example patent application FR-A1-2 883 347.

In the rolling bearing described in that document, there is provided a fixed seal on the outer ring including a friction lip that rubs against a radial collar on the inner ring.

Under some operating conditions, the seal of such a bearing can prove insufficient.

The present invention aims to overcome this drawback.

OBJECT AND BRIEF SUMMARY OF THE INVENTION

The present invention aims to provide a rolling bearing, notably for a clutch release bearing device, exhibiting an improved seal and that is simple to manufacture and to assemble.

In one embodiment the rolling bearing includes an inner ring, an outer ring, at least one row of rolling elements disposed between the rings, and at least one seal fixed to one of the rings. The seal includes at least one internal sealing lip cooperating with a first portion of the other ring. The seal further includes at least one external sealing lip offset axially relative to the internal sealing lip on the exterior side of the bearing. The external sealing lip cooperates with a second portion of the other ring that is separate from the first portion and situated axially facing the seal.

The seal preferably further includes a flange or shield on which the internal and external sealing lips are disposed, the shield being situated at least in part axially facing the second portion of the other ring. The shield may include a radial or substantially radial portion extending in the direction of the other ring, the internal and external sealing lips being disposed axially on either side of the portion.

The internal sealing lip may be oriented toward the interior of the bearing in the direction of the rolling elements and the external sealing lip may be oriented toward the exterior of the bearing.

In one preferred embodiment, the internal sealing lip cooperates by friction with the first portion of the other ring. The internal sealing lip is preferably mounted radially in contact against the first portion of the other ring.

In one preferred embodiment, the external sealing lip cooperates by friction with the second portion of the other ring. The external sealing lip may be mounted axially in contact against the second portion of the other ring. Alternatively, the external sealing lip may be mounted radially in contact against the second portion of the other ring.

In one embodiment, the first portion of the other ring extends axially as is extended radially by the second portion forming a collar. The first portion may extend from a third portion delimiting a raceway for the rolling elements.

The internal sealing lip is preferably annular.

In one embodiment, the external sealing lip is annular. Alternatively, the sealing lip includes a plurality of external sealing lips distributed over the circumference of the seal.

In one embodiment the seal is fixed to the outer ring. The other ring is preferably made in one piece, i.e. monobloc.

In one embodiment, the bearing further include an additional seal fixed to one of the rings and including at least one sealing lip cooperating with the other ring and disposed axially on the side opposite the seal relative to the rolling elements. The bearing may include a self-centering sleeve mounted in the bore of the inner ring and including the additional seal.

The invention also concerns a clutch release bearing device including a rolling bearing as defined above.

BRIEF DESCRIPTION OF THE DRAWINGS

The present invention will be better understood after reading the detailed description of embodiments given by way of non-limiting example and shown in the appended drawings, in which.

DETAILED DESCRIPTION OF PARTICULAR EMBODIMENTS

Figure 1:
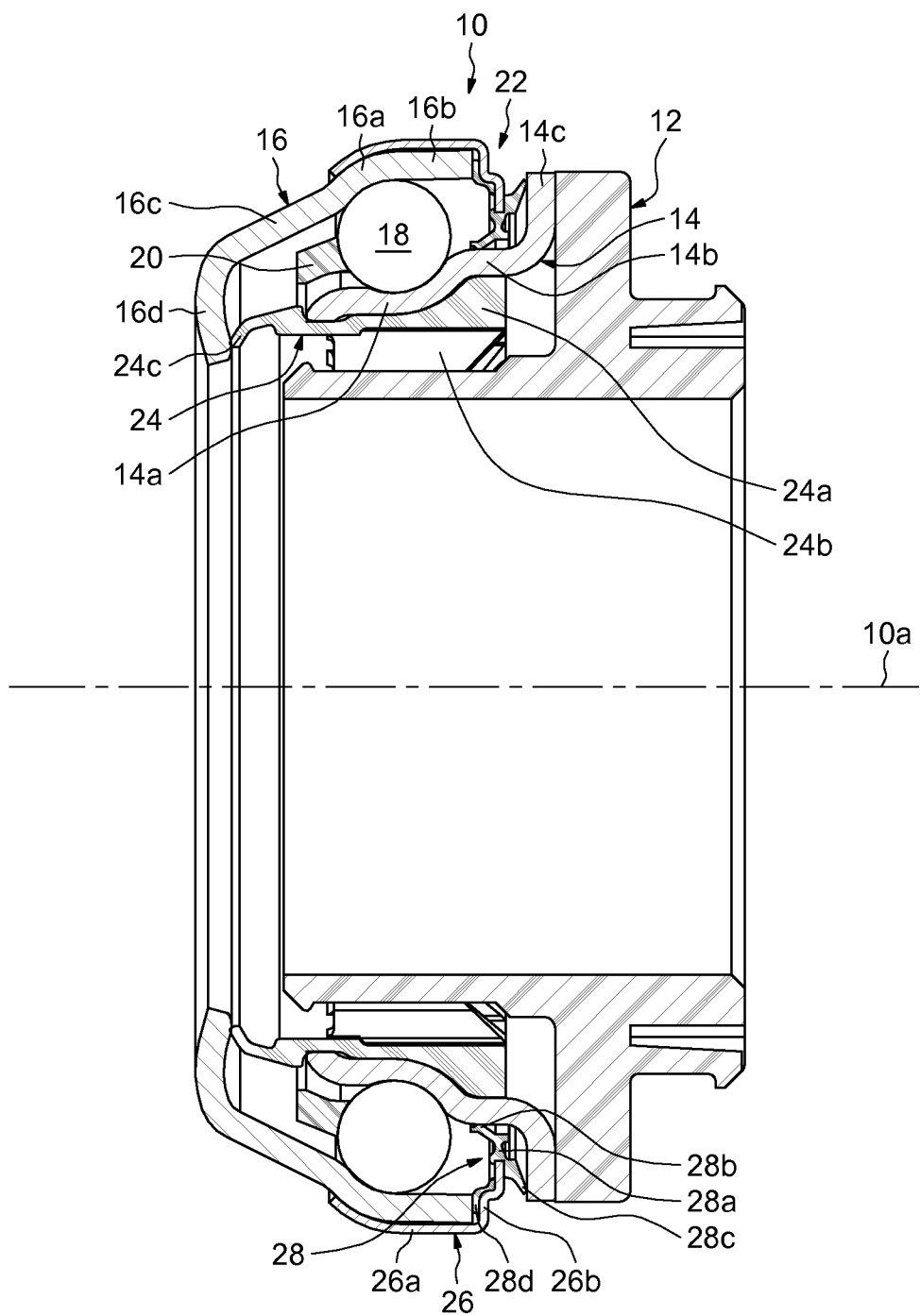
FIG. 1 is a view in axial section of a rolling bearing in accordance with a first embodiment of the invention.

FIG. 1 shows a rolling bearing 10 intended to be used in a clutch release bearing device provided to act on the diaphragm of a clutch, in particular for motor vehicles. The rolling bearing 10 is mounted on a maneuvering element 12 of the associated clutch release bearing device and is adapted to be moved axially relative to a guide tube (not represented).

The rolling bearing 10, which has an axis 10a, includes a non-rotatable interior ring 14, a rotatable outer ring 16, a row of rolling elements 18, here taking the form of balls and mounted between the rings, a cage 20 for maintaining the regular circumferential spacing of the rolling elements, and an annular seal 22 fixed to the outer ring. In the embodiment shown, the bearing 10 also includes a self-aligning sleeve 24 mounted in the bore of the inner ring 14. Alternatively, the bearing 10 may not include any such sleeve.

The thin-wall inner ring 14, the axis of which is the axis 10*a*, can advantageously be made by pressing a steel plate or a steel tube. The inner ring 14 is made in one piece. The inner ring 14 includes a toroidal portion 14*a* having in cross section a quarter-circle concave internal profile forming a toroidal track or raceway for the rolling elements 18. The inner ring 14 also includes an annular axial portion 14*b* extending a large-diameter edge of the toroidal portion 14*a* axially opposite the outer ring 16, which is itself extended radially outward by a radial portion forming an annular collar 14*c*. The collar 14*c* is situated axially on the side opposite the toroidal portion 14*a* and the rolling elements 18 relative to the axial portion 14*b*. The collar 14*c* is mounted to bear axially against the maneuvering element 12 axially on the side opposite the outer ring 16. The collar 14*c* is situated axially facing the seal 22.

The thin-wall outer ring 16, the axis of which is the axis 10*a*, can also advantageously be made by pressing a steel plate or a steel tube. The outer ring 16 is made in one piece. The outer ring 16 includes a toroidal portion 16*a* having in cross section a quarter-circle concave internal profile forming a toroidal track or raceway for the rolling elements 18. The outer ring 16 also includes an axial portion 16*b* extending a large-diameter edge of the toroidal portion 16*a* and radially surrounding the toroidal portion 14*a* of the inner ring. The outer ring 16 further includes a frustoconical portion 16*c* extending a small-diameter edge of the toroidal portion 16*a* axially opposite the axial portion 16*b* and an annular radial portion 16*d* extending the frustoconical portion 16*c* radially inward. The radial portion 16*d* is adapted to come axially into contact against a diaphragm of the clutch (not represented).

The retaining cage 20 is disposed radially between the toroidal portion 14*a* of the inner ring and the frustoconical portion 16*c* of the outer ring. The cage 20 is mounted axially between the rolling elements 18 and the radial portion 16*d* of the outer ring.

The seal 22 includes an armature or shield 26 on which is disposed a gasket 28 made from a flexible material providing a dynamic seal with the inner ring 14. By "dynamic seal" is meant a seal between two parts in relative motion.

The shield 26 is made from a rigid material, for example by pressing, cutting and bending a steel plate or a steel tube. Alternatively, the shield 26 may be made from a rigid synthetic material, for example polyamide. The generally annular shield 26 is fixed to the outer ring 16. The shield 26 is fixed directly to the outer ring 16. The shield 26 extends toward the inner ring 14 and is situated in part axially facing the collar 14*c* of the ring.

The shield 26 includes an annular axial portion 26*a* in radial contact against the exterior surface of the axial portion 16*b* of the outer ring and extended by an edge (not referenced) bent over the outer ring 16, for example by a crimping process, to provide axial and circumferential retention of the seal 22. The axial portion 26*a* is extended on the side opposite the edge by an annular radial portion 26*b* extending inward in the direction of the inner ring 14 and remaining at a distance from the latter. The radial portion 26*b* of the shield is situated axially facing the collar 14*c* of the inner ring. An axial space (not referenced) remains between the radial portion 26*b* of the shield and the collar 14*c*. In the embodiment shown, the radial portion 26*b* has a staggered shape so as to increase the stiffness of the shield 26. Alternatively, the radial portion 26 could extend in a purely rectilinear manner.

The gasket 28 may be made of elastomer, such as nitrile rubber, for example. The gasket 28 is molded or vulcanized onto the radial portion 26*b* of the shield. The gasket 28 includes an annular radial internal heel 28*a* and annular sealing lips 28*b*, 28*c* projecting from the heel respectively on the interior side and on the exterior side of the rolling bearing 10. The heel 28*a* covers the free end of the portion 26*d* of the shield and the radial front surface of the radial portion situated axially facing the radial portion 14*c* of the inner ring. The heel 28*a* is situated axially and radially at a distance from the inner ring 14. The internal lip 28*b* extends from an interior edge of the heel 28*a* and the external lip 28*c* extends from an exterior edge of the heel. The lip 28*b* is situated radially between the radial portion 26*b* of the shield and the axial portion 14*b* of the inner ring. The lip 28*c* is situated axially between the radial portion 26*b* of the shield and the collar 14*c* of the inner ring. With the inner ring 14, the lips 28*b*, 28*c* provide a dynamic sealing function.

The internal lip 28*b* is oriented toward the interior of the rolling bearing 10, i.e. on the same side as the rolling elements 18. The internal lip 28*b* extends obliquely downward and comes into rubbing contact with the axial portion 14*b* of the inner ring. The lip 28*b* is mounted in rubbing contact with the axial exterior surface of the axial portion 14*b*. The friction contact between the lip 28*b* and the inner ring 14 is radial. The lip 28*b* is flexible in the radial direction. The free edge of the lip 28*b* advantageously has in cross section a triangular shape so as to reduce the friction torque between the lip and the inner ring 14.

The external lip 28*c* is oriented toward the exterior of the rolling bearing 10, i.e. on the opposite side to the rolling elements 18. The external lip 28*c* extends obliquely upward and comes into rubbing contact with the collar 14*c* of the inner ring. The lip 28*c* is mounted in rubbing contact with the radial front surface of the collar 14*c* oriented on the same side as the outer ring 16. The friction contact between the lip 28*c* and the interior ring 14 is axial. The lip 28*c* is flexible in the axial direction. The lip 28*c* is offset radially toward the interior of the bearing relative to the axial exterior surface of the collar 14*c*. The lip 28*c* closes the axial space existing between the collar 14*c* and the shield 26. The free edge of the lip 28*c* advantageously has in cross section a triangular shape. In the embodiment shown, the lip 28*c* extends obliquely upward. Alternatively, the lip could extend obliquely downward and come to rub against the rounded portion of the inner ring connecting the axial portion 14*b* and the collar 14*c*.

The external lip 28*c* is situated axially on the side opposite the internal lip 28*b* relative to the heel 28*a*. The internal lip 28*b* and the external lip 28*c* are disposed axially on either side of the radial portion 26*b* of the shield. The external lip 28*c* is offset radially toward the exterior of the rolling bearing 10 relative to the internal lip 28*b*. The external lip 28*c* is offset axially toward the exterior of the rolling bearing 10 relative to the internal lip 28*b*. The external lip 28*c* situated axially between the shield 26 and the collar 14*c* of the inner ring forms beforehand a seal on the upstream side of the internal lip 28*b*, which makes it possible to limit polluting particles reaching the lip 28*b*.

In the embodiment shown, the gasket 28 also includes an annular radial external heel 28*d* covering in part the radial front surface of the radial portion 26*b* of the shield oriented in direction of the outer ring 16. With the outer ring 16 the heel 28*d* provides a static seal. By "static seal" is meant a seal between two parts having no relative movement. The heel 28*d* comes axially to bear against the radial edge of the axial portion 16*b* of the outer ring. The heel 28*d* is prestressed axially between the exterior face 16 and the shield 26. The heel 28*d* tends to resume its initial dimensions and to move the shield 26 axially on the side opposite the outer ring 16, which causes clamping of the edge of the shield onto the ring. This produces reliable axial retention of the seal 22 on the outer ring 16.

The self-aligning sleeve 24 is advantageously made from synthetic material, for example elastomer or natural rubber. The sleeve 24 includes an annular body 24*a* mounted in the bore of the inner ring 14 in radial contact with the bore and a plurality of ribs 24*b* parallel to the axis 10*a*, extending substantially radially toward the interior from the bore of the body 24*a* and the interior free edge of which comes into contact against the maneuvering element 12. The ribs 24*b* are deformable radially and allow the bearing 10 to move radially relative to the maneuvering element 12 during a clutch disengagement operation so as to allow the self-alignment of the bearing relative to the clutch diaphragm if the rotation axes of these two elements are not aligned.

The sleeve 24 further includes an annular sealing lip 24*c* in friction contact with the outer ring 16. The lip 24*c* is in friction contact with the radial portion 16*d* of the outer ring. The contact between the lip 24*c* and the outer ring 16 is axial. The lip 24*c* extends from an axial edge of the body 24*a*. Here the lip 24*c* extends obliquely inward. The lip 24*c* is disposed axially in the axial free space existing between the inner ring 14 and the radial portion 16*d* of the outer ring. The lip 24*c* allows prevention of intrusion of polluting foreign particles into this area between the inner ring 14 and the outer ring 16.

The lip 24*c* of the sleeve is disposed axially on the side opposite the seal 22 relative to the rolling elements 18. The lip 24*c* of the sleeve in friction contact with the outer ring and the internal lip 28*b* of the seal in friction contact with the interior ring 14 delimit radially between the rings a sealed annular space containing the rolling elements 18. This favors retention of the lubricant introduced into the closed space defined between the rings 14, 16 of the bearing.

Moreover, the external lip 28*c* of the seal offset axially relative to the lip 28*b* and situated axially between the shield 26 of the seal and the collar 14*c* of the inner ring allows limitation of the number of polluting particles reaching the internal lip. The provision of the external lip 28 placed on the upstream side of the internal lip 28*c* at the entry of the bearing 10 favors the obtaining of an improved seal.

Figure 2:
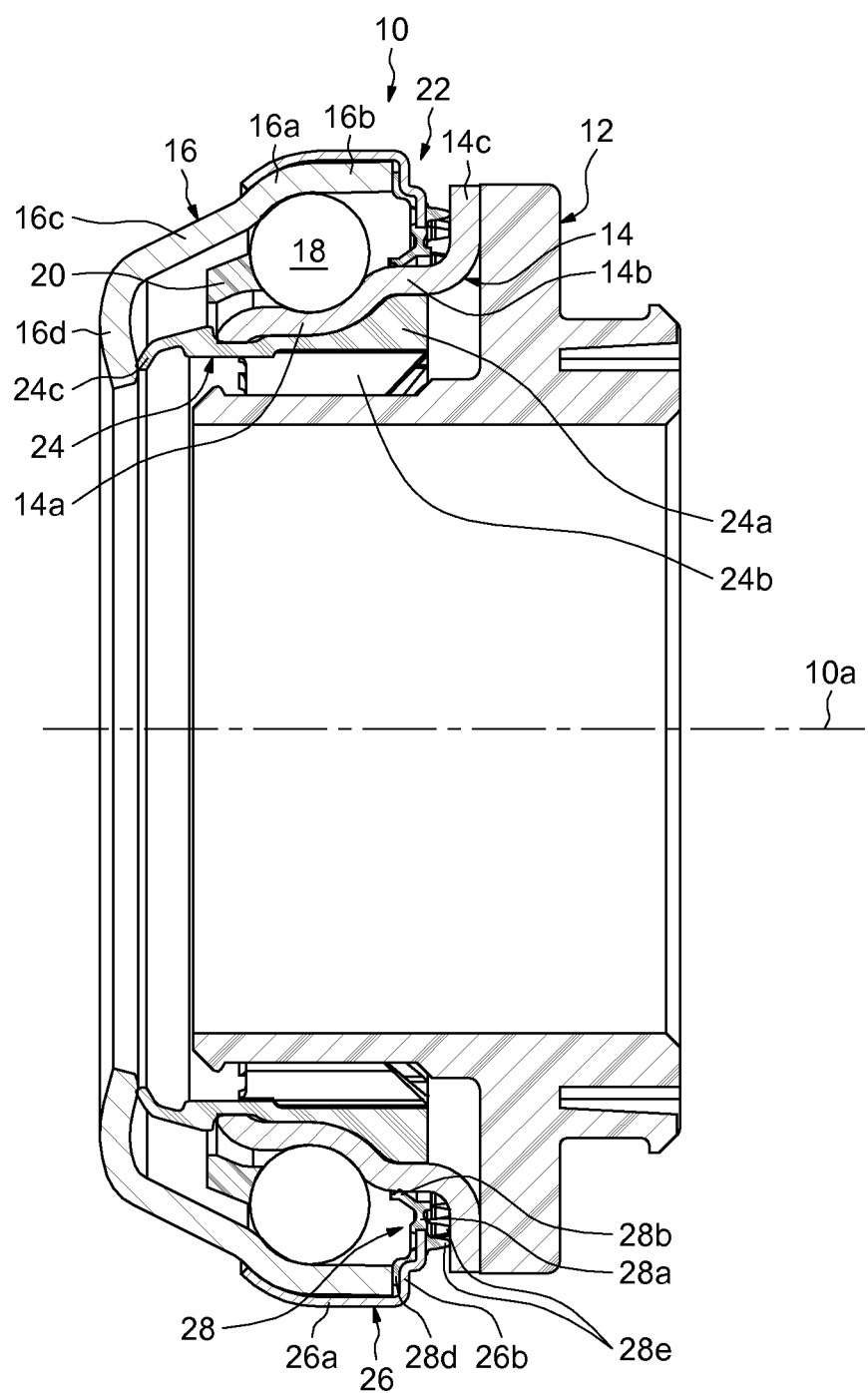
FIG. 2 is a view in axial section of a rolling bearing in accordance with a second embodiment of the invention.

The embodiment shown in FIG. 2, in which identical elements bear the same references, differs from the example described above only in that the seal 22 includes a plurality of external sealing lips 28*e* projecting from the exterior edge of the heel 28*a* of the gasket of the seal on the exterior side of the bearing 10. The disposition of the external lips 28*e* relative to the other elements of the seal 22, and more generally relative to the other elements of the bearing 10, is identical to that of the annular external lip 28*c* in the first embodiment described above.

Each external lip 28*e* extends axially and comes into rubbing contact with the collar 14*c* of the inner ring. Each lip 28*e* is mounted in rubbing contact with the front surface of the collar 14*c* oriented on the same side as the outer ring 16. The friction contact between the lip 28*c* and the inner ring 14 is axial.

Figure 3:
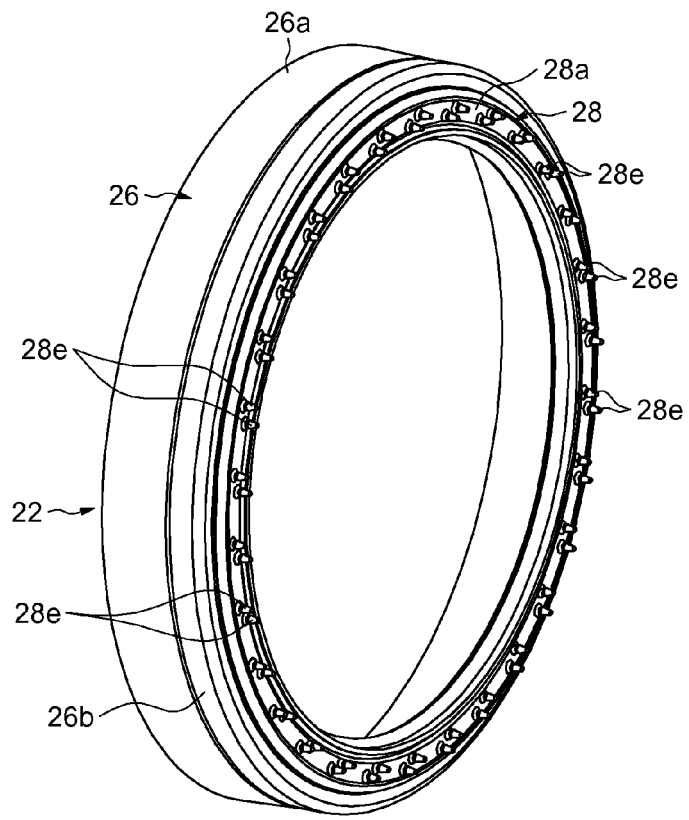
FIG. 3 is a perspective view of a seal of the bearing from FIG. 2.
Figure 4:
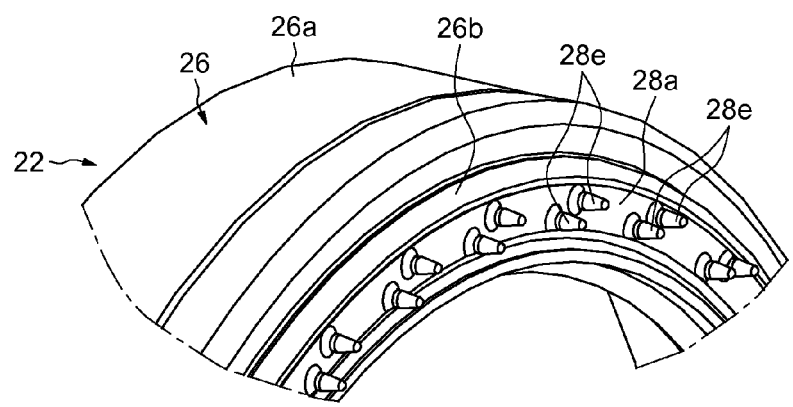
FIG. 4 shows a detail of FIG. 3.

As shown more visibly in FIGS. 3 and 4, the external lips 28*e* are distributed over the circumference of the seal 22. In the embodiment shown, the external lips 28*e* are arranged in pairs, the lips of a pair being offset radially relative to each other. The pairs of lips are identical to each other and spaced in a regular manner relative to one another in the circumferential direction. Alternatively, it is possible to provide a non-regular circumferential spacing of the lips 28*e*. Each lip 28*e* takes the form of a frustoconical protuberance or projection the free edge of which has in cross section a triangular shape. In an alternative embodiment, it would be possible to provide external lips 28*e* taking the form of fins or tongues spaced from one another in the circumferential direction in a regular or non-regular manner and disposed on the same diameter or not.

Figure 5:
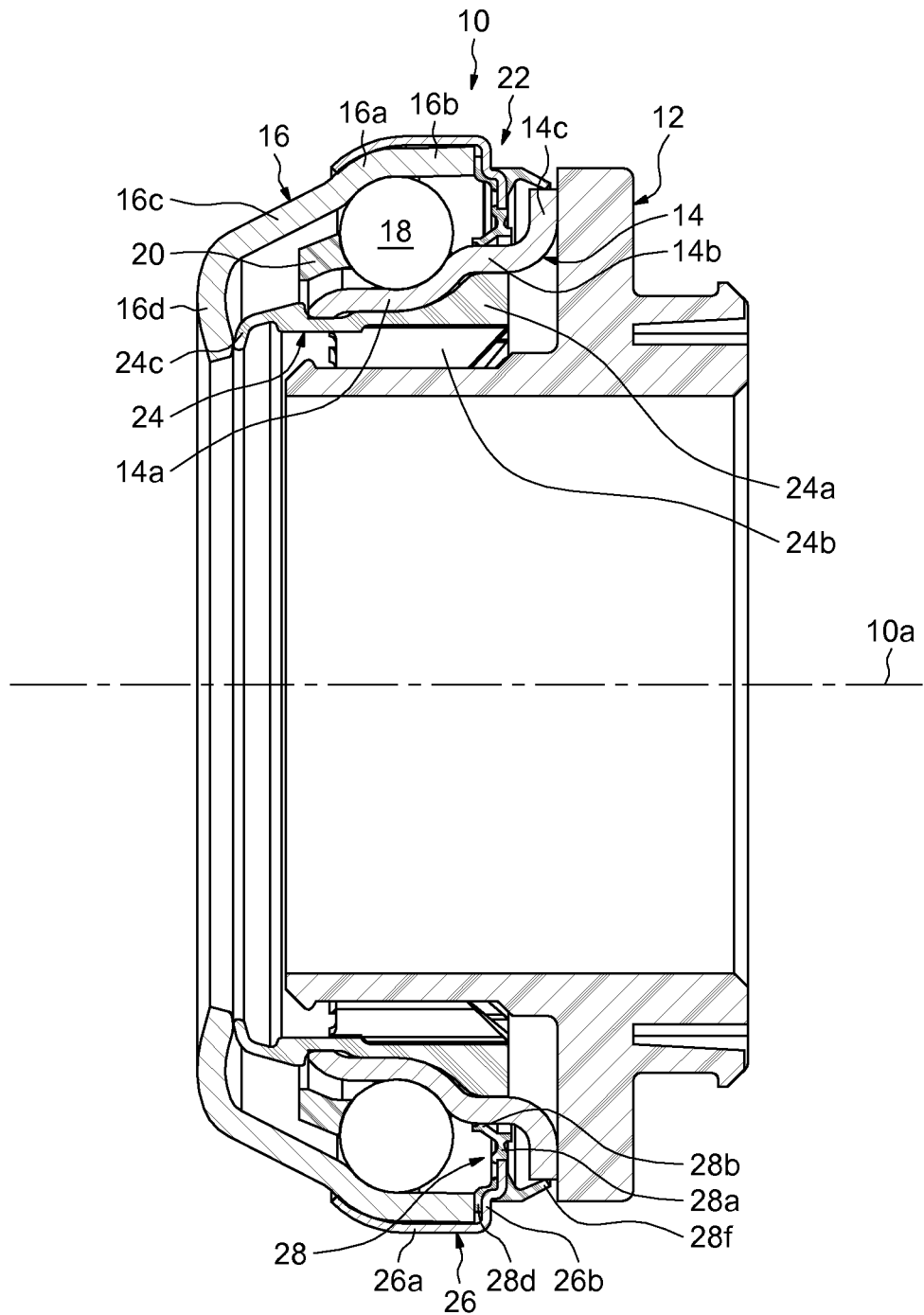
FIG. 5 is a view in axial section of a rolling bearing in accordance with a third embodiment of the invention.

The embodiment shown in FIG. 5, in which identical elements bear the same references, differs from the first embodiment described in that the seal 22 includes an annular external sealing lip 28*f* in rubbing contact in the radial direction with the inner ring 14. The sealing lip 28*f* projects toward the exterior of the bearing 10 from the exterior edge of the heel 28*a* of the gasket of the seal. The external lip 28*f* extends obliquely downward and comes into rubbing contact with the collar 14*c* of the inner ring. The lip 28*f* is mounted in rubbing contact with the axial exterior surface of the collar 14*c*. The lip 28*f* is flexible in the radial direction. The free edge of the lip 28*f* advantageously has in cross section a triangular shape so as to reduce the friction torque between the lip and the inner ring 14. The disposition of the external lip 28*f* relative to the other elements of the seal is identical to that of the external lip 28*c* with axial interference in the first embodiment described. The lip 28*f* is situated axially between the radial portion 26*b* of the shield and the front surface of the collar 14*c* of the inner ring forming a support for the maneuvering element 12. In this embodiment, the collar 14*c* of the inner ring has a small radial dimension so that the lip 28*f* of the seal leaves free the large-diameter edge of the radial portion 26*b* of the shield, as is also the case in the previous embodiments described. This makes it possible to press against this area of the shield 26 when mounting the seal 22 on the outer ring 16.

In the embodiments, the internal sealing lip of the seal rubs. Alternatively, this lip could be of the labyrinth type, i.e. form with the associated ring a seal by narrow passage(s). In an alternative embodiment, it would also be possible to provide for the seal one or more external sealing lips of the labyrinth type.

In the embodiments shown, the internal and external sealing lips of the seal extend from the heel of the gasket. Alternatively, these lips could extend directly from the shield, for example being molded onto the shield, for example onto the radial portion. In another variant, it would again be possible to fix the seal to the inner ring, the sealing lips then cooperating with the outer ring.

In the embodiments shown, the self-centering sleeve includes a lip cooperating through friction with the outer ring and disposed axially on the side opposite the seal relative to the rolling elements. Alternatively, it would be possible to provide an additional seal separate from the sleeve and fixed to the sleeve, the seal including a lip cooperating through friction with the outer ring or forming a narrow passage with the ring. In another variant, the additional seal could be fixed to the outer ring and cooperate with the inner ring, or vice-versa.

Thanks to the invention, a rolling bearing is available having an improved seal thanks to the use of a seal including at least one internal sealing lip cooperating with a first portion of the associated ring and at least one external sealing lip cooperating with a second portion of the ring that axially faces the seal, the external lip being offset toward the exterior of the bearing relative to the internal lip to limit the intrusion of polluting particles at the entry of the bearing.

The invention claimed is:

1. A rolling bearing including:
   an inner ring,
   an outer ring,
   at least one row of rolling elements disposed between the inner ring and the outer ring, and
   at least one seal fixed to the outer ring and comprising a shield and a gasket, the shield extending radially inwardly from an outer ring axial end towards the inner ring and ending at a radially innermost edge, the gasket being formed of elastomer and further comprising a radial internal heel, an internal sealing lip, and an external sealing lip, wherein the radial internal heel covers the radially innermost edge of the shield,
   the internal sealing lip extends from the radial internal heel in a first direction that is radially inwardly and axially towards the at least one row of rolling elements, the internal sealing lip cooperating with a first portion of the inner ring,
   the external sealing lip extends from the radial internal heel in a second direction that is radially outwardly and axially away from the at least one row of rolling elements such that the external sealing lip is offset axially relative to the internal sealing lip on the exterior side of the rolling bearing, the external sealing lip cooperating with a second portion of the inner ring that is separate from the first portion and situated axially facing the at least one seal.

2. The rolling bearing according to claim 1, the shield being situated, at least in part, axially facing the second portion of the inner ring.

3. The rolling bearing according to claim 2, wherein the shield includes a substantially radial portion extending towards the inner ring, the internal sealing lip and the external sealing lip being disposed axially on opposite sides of the substantially radial portion.

4. The rolling bearing according to claim 1, wherein the internal sealing lip cooperates by friction with the first portion of the inner ring.

5. The rolling bearing according to claim 4, wherein the internal sealing lip is mounted radially in contact against the first portion of the inner ring.

6. The rolling bearing according to claim 1, wherein the external sealing lip cooperates by friction with the second portion of the inner ring.

7. The rolling bearing according to claim 6, wherein the external sealing lip is mounted axially in contact against the second portion of the inner ring.

8. The rolling bearing according to claim 1, wherein the first portion of the inner ring extends axially and is extended radially by the second portion forming a collar.

9. The rolling bearing according to claim 1, wherein the internal sealing lip is annular.

10. The rolling bearing according to claim 1, wherein the external sealing lip is annular.

11. A rolling bearing including:
    an inner ring,
    an outer ring,
    at least one row of rolling elements disposed between the rings, and
    at least one seal fixed to one of the inner ring or the outer ring, the at least one seal including at least one internal sealing lip cooperating with a first portion of the other ring, the at least one seal further including at least one external sealing lip offset axially relative to the internal sealing lip on the exterior side of the bearing, the external sealing lip cooperating with a second portion of the other of the inner ring or the outer ring that is separate from the first portion and situated axially facing the seal,
    the at least one seal further including a plurality of external sealing lips distributed over a circumference of the at least one seal.

12. The rolling bearing according to claim 1, further including an additional seal fixed to one of the inner ring or the outer ring, and
including at least one sealing lip cooperating with the other of the inner ring or the outer ring and disposed axially on the side opposite the at least one seal relative to the at least one row of rolling elements.

13. The rolling bearing according to claim 12, further comprising a self-centering sleeve mounted in the bore of the inner ring and including the additional seal.

14. A clutch release bearing device, comprising:
    a rolling bearing including:
      an inner ring comprising a toroidal portion forming a raceway, an axial portion extending from the toroidal portion in an axial direction, and a collar extending radially outwardly from an axial end of the axial portion, when viewing the collar in cross-section, the collar comprising an axially inner, radially extending surface and an axially outer, radially extending surface that are connected at a radially outermost portion by an axially extending surface, the axially extending surface of the collar having an inner ring maximum diameter,
      an outer ring,
      at least one row of rolling elements disposed between the inner ring and the outer ring, and
      at least one seal fixed to the outer ring and extending radially inwardly to axially face the collar of the inner ring, the at least one seal including at least one internal sealing lip cooperating with the axial portion of the inner ring,
    the at least one seal further including at least one external sealing lip offset axially relative to the internal sealing lip on the exterior side of the rolling bearing, the at least one external sealing lip contacting the axially extending surface of the collar of the inner ring,
    wherein the rolling bearing is integrated into the clutch release bearing device.

* * * * *